United States Patent [19]

O'Brien

[11] Patent Number: 5,479,489
[45] Date of Patent: Dec. 26, 1995

[54] VOICE TELEPHONE DIALING ARCHITECTURE

[75] Inventor: Stephen A. O'Brien, Naperville, Ill.

[73] Assignee: AT&T Corp., Murray Hill, N.J.

[21] Appl. No.: 345,960

[22] Filed: Nov. 28, 1994

[51] Int. Cl.$^6$ .................................................... H04M 3/42
[52] U.S. Cl. ........................... 379/67; 379/201; 379/207
[58] Field of Search ................................ 379/67, 88, 89, 379/201, 207, 214, 216

[56] References Cited

U.S. PATENT DOCUMENTS

| | | | |
|---|---|---|---|
| 4,827,500 | 5/1989 | Binkerd et al. | 379/207 |
| 4,918,322 | 4/1990 | Winter et al. | 379/214 |
| 5,181,237 | 1/1993 | Dowden et al. | 379/88 |
| 5,199,062 | 3/1993 | Von Meister et al. | 379/89 |
| 5,301,227 | 4/1994 | Kamei et al. | 379/88 |
| 5,384,834 | 1/1995 | Sato et al. | 379/88 |

OTHER PUBLICATIONS

"Subword–Based Large–Vocabulary Speech Recognition", Chin–Hui Lee, Jean–Luc Gauvain, Roberto Pieraccini, Lawrence R. Rabiner, *AT&T Technical Journal*, Sep./Oct. 1993, pp. 25–35.

"AT&T's Global Intelligent Network Architecture", Herbert W. Kettler, Gautham Natarajan, Ecsterina W. Scher, Phillip Y. Shih, Peggy Marr Wainscott *AT&T Technical Journal*, Sep./Oct. 1992, pp. 30–35.

*Primary Examiner*—Jeffery A. Hofsass
*Assistant Examiner*—Scott Wolinsky

[57] ABSTRACT

A method and apparatus for establishing a telecommunications call connection in response to a phrase uttered by a caller. Data for the caller is stored in a data base shared by a plurality of switching systems. The data comprises a plurality of phoneme strings, each phoneme string corresponding to the phonemes for a phrase uttered by the customer during the training phase and a telephone number corresponding to the utterance. When the caller subsequently uses the service his/her utterance at the time of use is compared to the phoneme strings stored for that customer to establish the best match and thereby identify the telephone number.

6 Claims, 4 Drawing Sheets

VOICE TELEPHONE DIALING ARCHITECTURE

TECHNICAL FIELD

This invention relates to arrangements for permitting telephone customers to place calls by uttering an identifying phrase specific to that caller.

PROBLEM

Ever since the concept of automatic speech recognition was proposed there have been proposals for letting customers speak a name or other utterance (such as "home") and being automatically connected to the telephone corresponding to that name or phrase for that caller. Two of the more recent proposals for accomplishing this task have relied on the use of an intelligent peripheral located in a facility that is shared by many offices and the use of an automated operator accessed via an operator assistance call. The reason for these more specialized types of treatment of such calls is the large amount of storage required in such systems to search a data base for identifying the telephone number that corresponds to the number requested by the caller and for storing data for use in an announcement back to the caller identifying the name of the party that will be called in response to the voice utterance. Systems which do not use the local switch connected to a customer for implementing the voice dialing arrangement necessarily introduce significant additional delay in the establishment of voice dialed calls and require that the circuit for the call be routed via special switching arrangements. A problem of the prior art is that there is no good arrangement for using a local switch accessing a centralized data base for the automatic establishment of calls in response to a spoken utterance.

SOLUTION

The above problem is significantly ameliorated and an advance is made over the prior art in accordance with this invention wherein the data that is stored for comparison with utterance is one or more phoning phoneme strings for each utterance and the corresponding telephone number and phoneme string for that called customer; the generation of the phoneme string corresponding to the caller's utterance and the comparison of that phoneme swing with the set of phoneme strings stored in a centralized data base is performed in the central office. In accordance with one preferred embodiment the central office then sends to the data base the identification of the caller and an identification of the one or more phoneme strings with which the caller's utterance most closely matches and the data base returns a phoneme string corresponding to the called name and the called telephone number. In accordance with an alternate embodiment of the invention the set of phoneme strings and the corresponding called number phoneme string and called number is returned from the data base in response to the initial inquiry for data concerning the calling customer's list. Advantageously such an arrangement reduces the total amount of data required to be sent from the data base to the calling local switch and avoids the necessity for establishing a separate connection to a facility for making the speech to called telephone number and called name announcement translation.

In accordance with the preferred embodiment the list is generated in a training session wherein the caller provides an utterance and telephone number for each telephone number in his/her voice dialing list. In one specific embodiment the utterance is repeated several times so that, if necessary, several phoneme strings may be generated to correspond to the single utterance. The phoneme strings which are derived in the central office are then transmitted along with the corresponding telephone number to the data base. In the data base a reverse white pages directory is used to convert the telephone number into the text of a name for conversion to a phoneme string for announcement to a caller. If the called number is unlisted it may be desirable to provide an announcement such as "unlisted number 1" to the caller, in which case no special phoneme string is needed for the announcement.

In accordance with one aspect of the invention the data base is accessible from remote switching systems. The calling customer may identify himself/herself via a calling card number which number can then be converted in a calling card data base to an owner's directory number for selecting and accessing the appropriate voice dialing data base.

DETAILED DESCRIPTION

Figure 1:
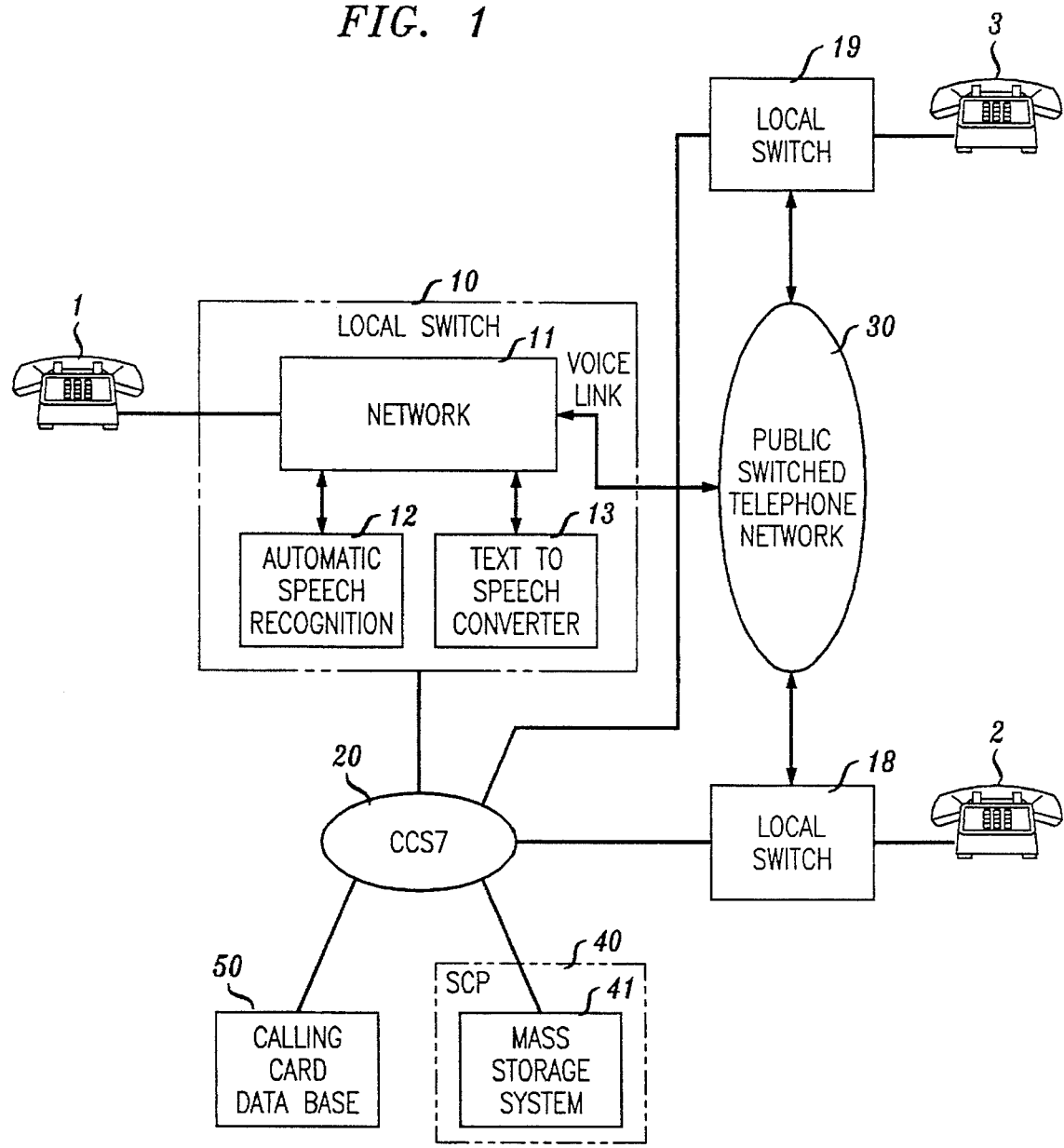
FIG. 1 is a block diagram showing the overall operation of the invention.

FIG. 1 is a basic block diagram showing the operation of the invention. A caller station 1 connected to local switch 10 wishes to call called station 2 connected to local switch 18. Local switch 10 includes a switching network 11 for interconnecting the caller station 1 with an automatic speech recognition unit 12 for generating phonemes from speech. A text to speech converter 13 for converting either raw text or phonemes to digital speech. The network also is used for connecting the caller's station to the public switched telephone network 30 for connection to local switch 18 and then called station 2. Local switch 10 is also connected to a common channel signaling CCS7 network 20 for transmitting data messages between switches and a data base of SCP (Switching Control Point)40. SCP 40 contains mass storage system 41 for storing the data illustrated in FIG. 4 which is used to translate between an utterance and a telephone number and the name text associated with that telephone number. When the caller station is in the training mode it transmits voice utterances to local switch 10 which converts these utterances into data for storage in SCP 40. When the caller station is in the use mode then the local switch 10 transmits the identity of the caller station to SCP 40 to obtain data and in the preferred mode of operation also transmits an index to the recognized phoneme list in order to obtain the called telephone number and the text (in straight ASCII or ASCII-phoneme format. Upon receipt of the appropriate text information from the SCP 40 the local switch announces this text to caller station 1 and unless caller station 1 immediately disconnects establishes a connection to the telephone number obtained from SCP 40. This telephone connection, if the call is an interoffice call, goes over the public switch telephone network 30 which interconnects local switches 10, 18 and 19. If the caller who normally calls from caller station 1 makes a call from caller station 3 connected to local switch 19, then if the call is a calling card call and the calling card verification data base has been enhanced to include the directory number of the owner of the call calling card then the identification of the owner of the calling card is used by local switch 19 to obtain voice dialing data for the caller (who is the owner of calling station 3) using the caller identification obtained from the calling card data base 50. Thereafter the call is established in essentially the same way as a call from caller station 1.

Figure 2:
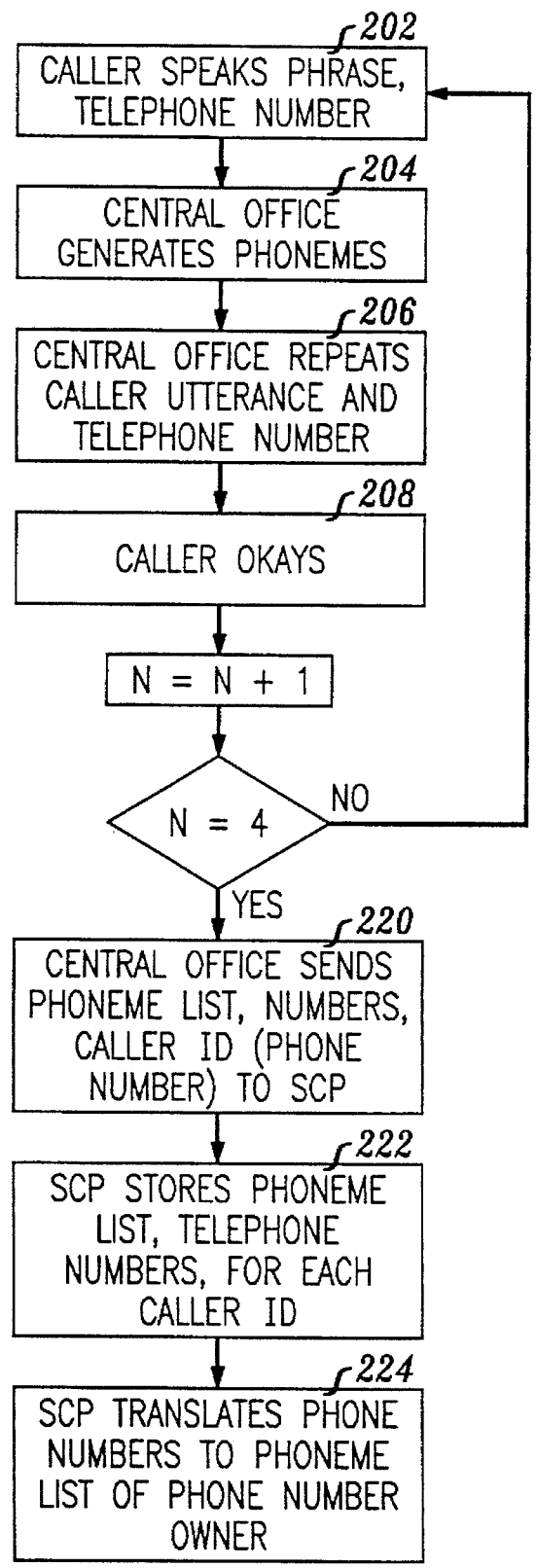
FIGS. 2 and 3 are flow diagrams of the process of training and use of the voice dialing arrangement.

FIG. 2 is a flow diagram illustrating the operation of the training phase of the invention. During the training phase the caller provides the data necessary to populate SCP 40 with the data required to serve the caller's voice dialing needs. The caller speaks a phrase (such as a name or an identifying indicator such as "home") and either speaks or keys the corresponding telephone number. The central office ASR unit generates phonemes corresponding to the phrase (action block 204). The central office then repeats to the caller the recorded utterance and the entered number (action block 206) and the caller okays the entry presumably by keying a number such as sharp 99. Action blocks 202, 204, 206 and 208 are repeated 4 times in order to get a good sample of the phrases so that corresponding phonemes can be generated. It is believed that only two phoneme strings need be stored for each number but further experimentation may indicate that a higher number is required.

The central office then sends the phoneme list and the number corresponding to each phoneme list to the SCP 40 along with the identification of the caller, i.e., the telephone number of that caller.

The SCP (action block 220) stores the phoneme list and telephone numbers for each caller ID (action block 222) in the preferred embodiment the SCP translates the stored telephone numbers to a text string of the owner of each telephone number using a reverse white page translation. In an alternative embodiment, the SCP may store the telephone number owner as a simple pass key character string and let the text to speech converter in the central office convert that ASCII string to phonemes and then to speech.

Figure 3:
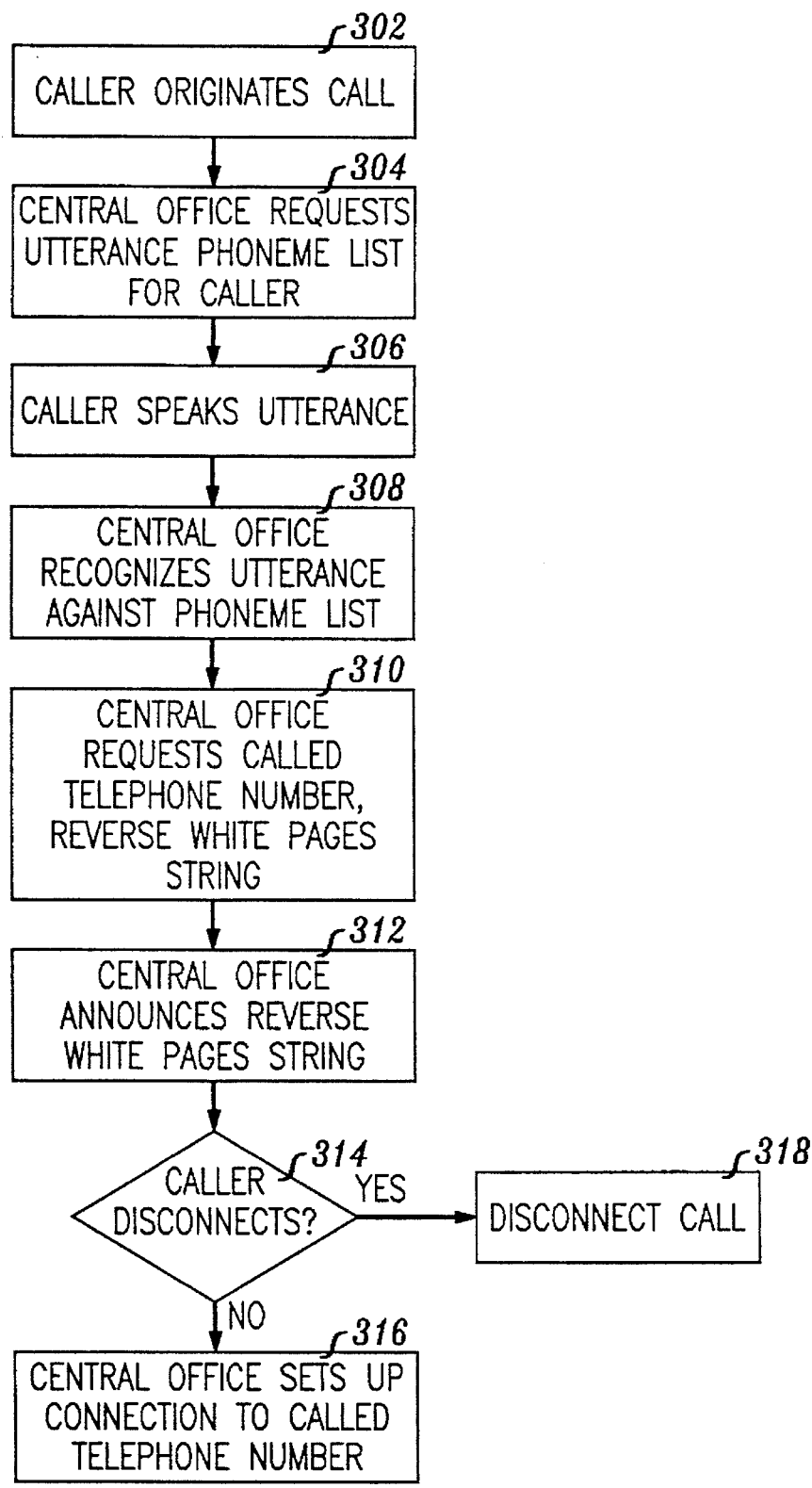

FIG. 3 is a flow diagram illustrating use of the automatic voice dialing arrangement. The caller originates a call (action block 302). The local switch requests a phrase phoneme list for that caller from the SCP (action block 304) and the caller speaks a phrase (action block 306). The central office recognizes the phrase against the phoneme list supplied from the SCP (action block 308). The central office then requests the called telephone number and the reverse white pages string from SCP 40 (action block 310). The central office then announces the reverse white pages string (action block 312). Test 314 is used to determine whether the caller disconnects because the announced string does not correspond to the name of the called customer. If the caller has not disconnected, then the local switch sets up the connection to the called telephone number (action block 316). If the caller does disconnect then the call is disconnected (action block 318).

Figure 4:
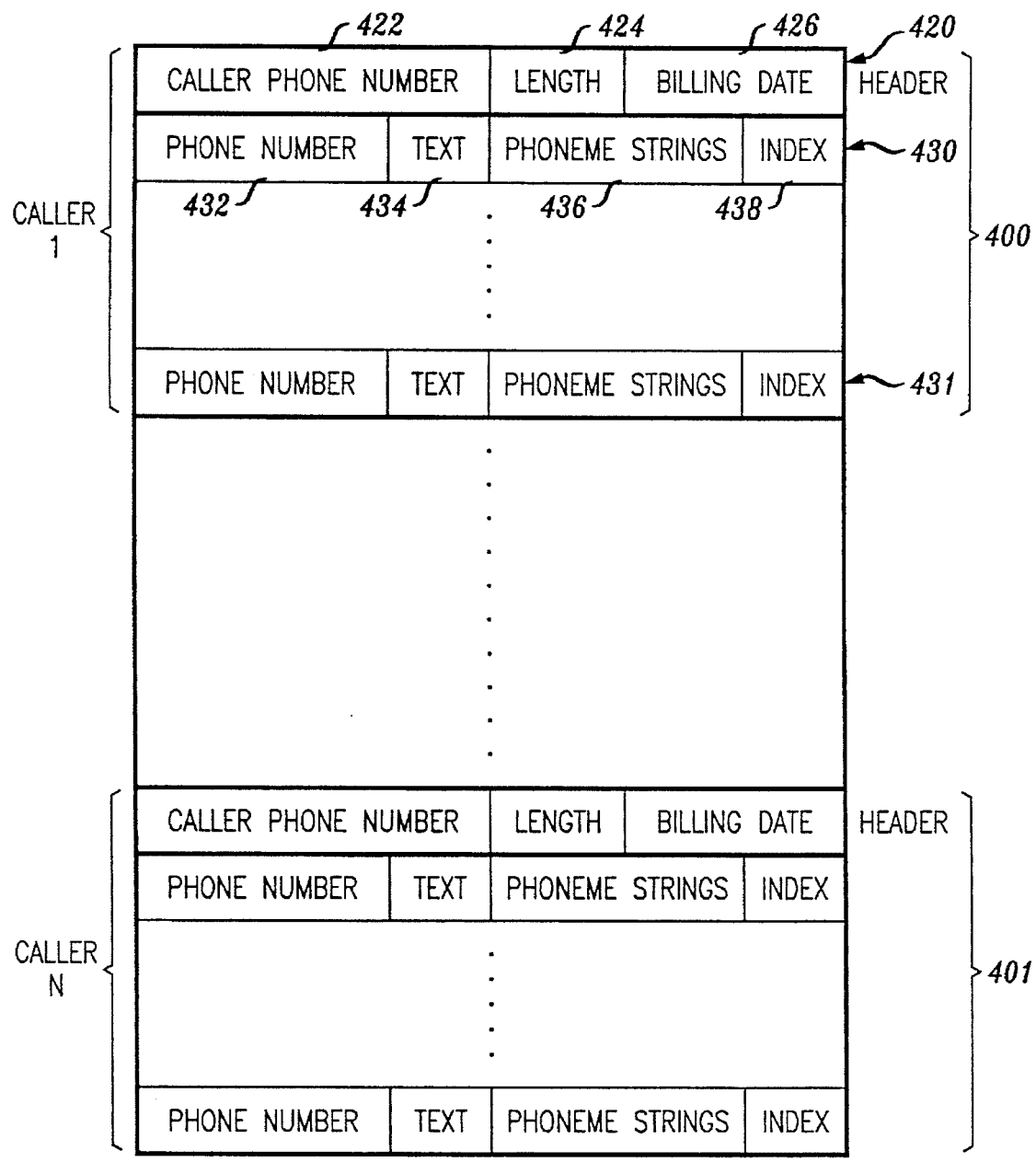
FIG. 4 is a layout of data stored in the data base for implementing the voice dialing arrangement.

FIG. 4 is a layout of memory in the mass storage system 41. For each caller there is a block such as block 400. Each such block has a header 420 which includes the caller telephone number, the length of the total list and billing data for keeping track of the usage of the automatic voice dialing arrangement. For each called telephone number specified by caller 1 there is a block 430 including a telephone number 432 text for identifying that telephone number 434, one or more phoneme strings corresponding to the phrases for selecting that telephone number 436 and an index 438 to identify the entry (in accessing the SCP 40 after the customers spoken utterance has been identified, only the index is required in order to obtain the text and the telephone number). For caller 1 there is a plurality of blocks such as 430, namely 430 . . . 431.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of establishing a telecommunications connection using a data base shared by a plurality of local switching systems, comprising the steps of:

responsive to receipt of a plurality of first utterances from a customer and an indication of telephone numbers corresponding to said plurality of first utterances, storing data representing a plurality of phoneme swings representing said first utterances and data representing an indication of said telephone numbers for said customer in a data base shared by a plurality of local switching systems;

subsequently receiving a call origination in a local switching system for serving said customer;

said local switching system requesting data representing phoneme strings for said customer stored in said data base and said data base transmitting said data to said local switching system for serving said customer;

in said local switching system for serving said customer, responsive to receipt of a second utterance from said customer, matching said second utterance against the requested phoneme strings to establish a best match against a phoneme string representing one of said first utterances;

determining a telephone number corresponding to said phoneme string representing said one of said first utterances; and establishing a connection to the determined telephone number.

2. The method claim 1 wherein the step of determining a telephone number comprises the step of transmitting telephone numbers corresponding to the phoneme strings for said customer to said local switching system for serving said customer and performing the determination in said local switching system for serving said customer based on the best match between said second utterance and a phoneme string representing one of said first utterances.

3. The method of claim 1 wherein the step of determining comprises the step of transmitting to said data base data for identifying the phoneme string representing one of said first utterances;

identifying the telephone number corresponding to said phoneme string in said data base; and transmitting said telephone number from said data base to said switching system.

4. The method of claim 1 further comprising the step of:

responsive to receiving an indication for identifying a customer and an indication that a second call is being established using voice calling, retrieving data for representing phoneme strings for said customer in said data base; and transmitting said data to another switching system connected to said customer for said second call.

5. The method of claim 4 wherein said indication for identifying said customer is data representing a calling card number.

6. The method of claim 1 wherein the step of storing data representing a plurality of phoneme strings representing said first utterances comprises storing data representing a plurality of phoneme strings for each of at least some of said first utterances.

* * * * *

UNITED STATES PATENT AND TRADEMARK OFFICE
CERTIFICATE OF CORRECTION

PATENT NO. : 5,479,489
DATED : December 26, 1995
INVENTOR(S) : Stephen A. O'Brien It is certified that error appears in the above-identified patent and that said Letters Patent is hereby corrected as shown below:

Column 4, claim 1, line 14, delete "swings" and insert --strings--.

Signed and Sealed this

Twenty-seventh Day of March, 2001

Attest:

NICHOLAS P. GODICI

Attesting Officer

Acting Director of the United States Patent and Trademark Office